United States Patent
Sahu et al.

(10) Patent No.: US 10,432,477 B2
(45) Date of Patent: Oct. 1, 2019

(54) PERFORMANCE MONITORING AT EDGE OF COMMUNICATION NETWORKS USING HYBRID MULTI-GRANULAR COMPUTATION WITH LEARNING FEEDBACK

(71) Applicant: HITACHI, LTD., Tokyo (JP)

(72) Inventors: Anshuman Sahu, San Jose, CA (US); Chetan Gupta, San Mateo, CA (US); Song Wang, Mountain View, CA (US); Umeshwar Dayal, Saratoga, CA (US)

(73) Assignee: HITACHI, LTD., Tokyo (JP)

( * ) Notice: Subject to any disclaimer, the term of this patent is extended or adjusted under 35 U.S.C. 154(b) by 194 days.

(21) Appl. No.: 15/536,914

(22) PCT Filed: Jan. 30, 2015

(86) PCT No.: PCT/US2015/013966
§ 371 (c)(1),
(2) Date: Jun. 16, 2017

(87) PCT Pub. No.: WO2016/122659
PCT Pub. Date: Aug. 4, 2016

(65) Prior Publication Data
US 2019/0104028 A1    Apr. 4, 2019

(51) Int. Cl.
*H04L 12/24*    (2006.01)
*G06F 11/34*    (2006.01)
*H04L 12/26*    (2006.01)
*H04L 29/08*    (2006.01)

(52) U.S. Cl.
CPC ............ *H04L 41/147* (2013.01); *G06F 11/34* (2013.01); *G06F 11/3419* (2013.01); *H04L 41/142* (2013.01); *H04L 41/145* (2013.01); *H04L 41/5019* (2013.01); *H04L 43/0876* (2013.01); *H04L 67/1097* (2013.01); *G06F 2201/875* (2013.01)

(58) Field of Classification Search
CPC ...................................................... H04L 41/147
See application file for complete search history.

(56) References Cited

U.S. PATENT DOCUMENTS

| | | | |
|---|---|---|---|
| 9,998,393 B2* | 6/2018 | Hanis | ............ H04L 47/72 |
| 2014/0075111 A1 | 3/2014 | Pike | |
| 2014/0089493 A1 | 3/2014 | Bauer et al. | |
| 2014/0310219 A1* | 10/2014 | Prahlad | ............ G06F 3/0605 706/21 |

OTHER PUBLICATIONS

International Search Report and Written Opinion for PCT App No. PCT/US2015/013966 dated Aug. 28, 2015, 7 pgs.

* cited by examiner

*Primary Examiner* — Adnan M Mirza
(74) *Attorney, Agent, or Firm* — Procopio, Cory, Hargreaves & Savitch LLP

(57) ABSTRACT

Example implementations disclosed herein are directed to monitoring communications networks in real time to ensure that they are performing in a desired fashion. Metrics such as utilization and latency are monitored to ensure that customer SLAs (Service Level Agreements) are met in a timely fashion. To detect problems in advance, example implementations predict the future values of metrics and detect events if the future value violates certain conditions. Example implementations build models that can predict the future values of metrics and analyze historical, near real time and real time streaming data so as to build predictive models.

11 Claims, 12 Drawing Sheets

| Name | Data Type | Description |
|---|---|---|
| Current time stamp | $t\ (d{:}m{:}yyyy,h{:}m{:}s)$ | Current time |
| Window size | $t(s)$ | Time interval window for real-time storage |
| In-memory time interval | $t_{in}(s)$ | Time interval for transfer of data from in-memory to long-term |
| In-memory storage capacity | $C_m\ (Bytes)$ | Capacity for storage in in-memory |
| Batch-size | $\alpha\ (Bytes)$ | Batch size transfer from in-memory to long-term |

PERFORMANCE MONITORING AT EDGE OF COMMUNICATION NETWORKS USING HYBRID MULTI-GRANULAR COMPUTATION WITH LEARNING FEEDBACK

CROSS-REFERENCE TO RELATED APPLICATIONS

This application is a U.S. National Stage entry of PCT Application No. PCT/US2015/013966, filed on Jan. 30, 2015, the contents of which are incorporated herein by reference.

BACKGROUND

Field

The present disclosure is directed generally to storage and network systems, and more specifically, to systems and methods for monitoring communication networks.

Related Art

In the related art of communications networks as well as in other settings like electric or water utility monitoring, real-time monitoring is implemented. In some related art implementations, monitoring systems conduct the aggregating of real-time data and historical analysis.

SUMMARY

Example implementations are directed to systems and methods such as a platform in communications network to provide a rich set of performance monitoring measures. Example implementations further involve a hybrid computation approach with feedback learning and trigger based analytics, which can be instantiated in not just communication network monitoring, but other network domains like electric and water utility monitoring.

Aspects of the present disclosure are directed to systems and methods that monitors real time traffic on networks and identifies problems before they occur.

Aspects of the present disclosure include a management server, which can include a memory configured to manage a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period; and a processor, configured to: compute a prediction model of traffic to the storage system based on the application of weights to the first prediction model, the second prediction model, and the third prediction model; and update the application of weights based on traffic results.

Aspects of the present disclosure further include a method, which can include managing a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period; computing a prediction model of traffic to the storage system based on the application of weights to the first prediction model, the second prediction model, and the third prediction model; and updating the application of weights based on traffic results.

Aspects of the present disclosure further include a computer program storing instructions for executing a process, the instructions which can include managing a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period; computing a prediction model of traffic to the storage system based on the application of weights to the first prediction model, the second prediction model, and the third prediction model; and updating the application of weights based on traffic results. The computer program may be stored on a non-transitory computer readable medium and executed by one or more processors.

BRIEF DESCRIPTION OF DRAWINGS

FIG. 7 illustrates example management information for the management server 420, in accordance with an example implementation.

DETAILED DESCRIPTION

Figure 1A:
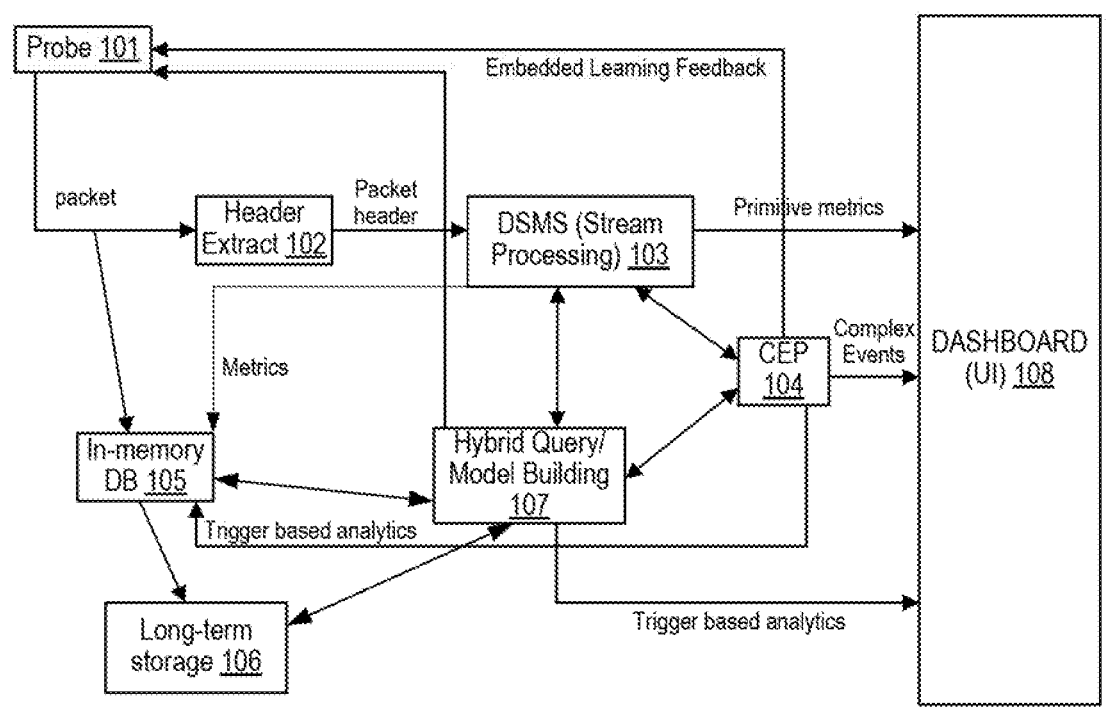
FIGS. 1A to 1C illustrate a system diagram in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

In example implementations of the present disclosure, the end customer may be defined as an entity that develops/deploys this system. The user refers to entities which generate traffic. Hybrid computation can involve computation done over different time granularities. Adaptive can refer to the fact that a mechanism can be enabled to tune parameters.

There is a need in the related art to monitor communications networks in real time to ensure that they are performing in a desired fashion. Example implementations of the present disclosure monitor metrics such as utilization and latency to ensure that customer SLAs (Service Level Agreements) are met in a timely fashion. It may not be enough to identify problems once they have occurred. Instead, example implementations facilitate anticipating potential problems so that managers of the system can take action before the problems impact the performance of the network and impact customer SLAs.

To detect problems in advance example implementations predict the future values of metrics (for example utilization and latency) and detect events if the future value violates certain conditions. To be able to build models that can predict the future values of metrics successfully, example implementations of the present disclosure analyze historical, near real time and real time streaming data, and build predictive models jointly over this data.

The related art presently does not incorporate embedding learnings from the model to the edge of the network. There is also a lack in the related art of joint predictive models over historical, real time, and near real time data. In some related art implementations, monitoring systems conduct the aggregating of real-time data and historical analysis but don't have implementations with respect to how to utilize all the data and to incrementally update models built over all data as additional data flows in. Example implementations of the present disclosure attempt to address the issues of the related art.

Figure 1B:
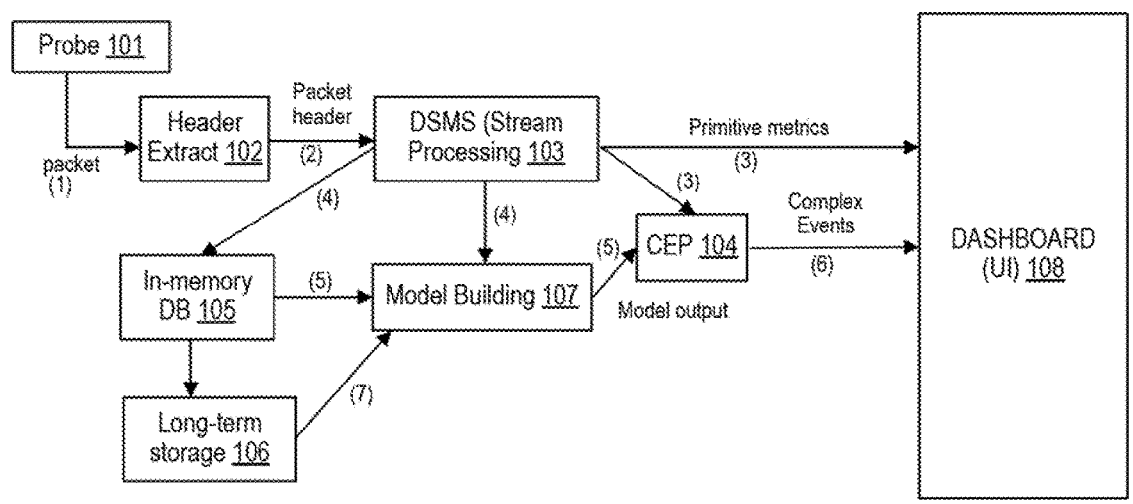
Figure 1C:
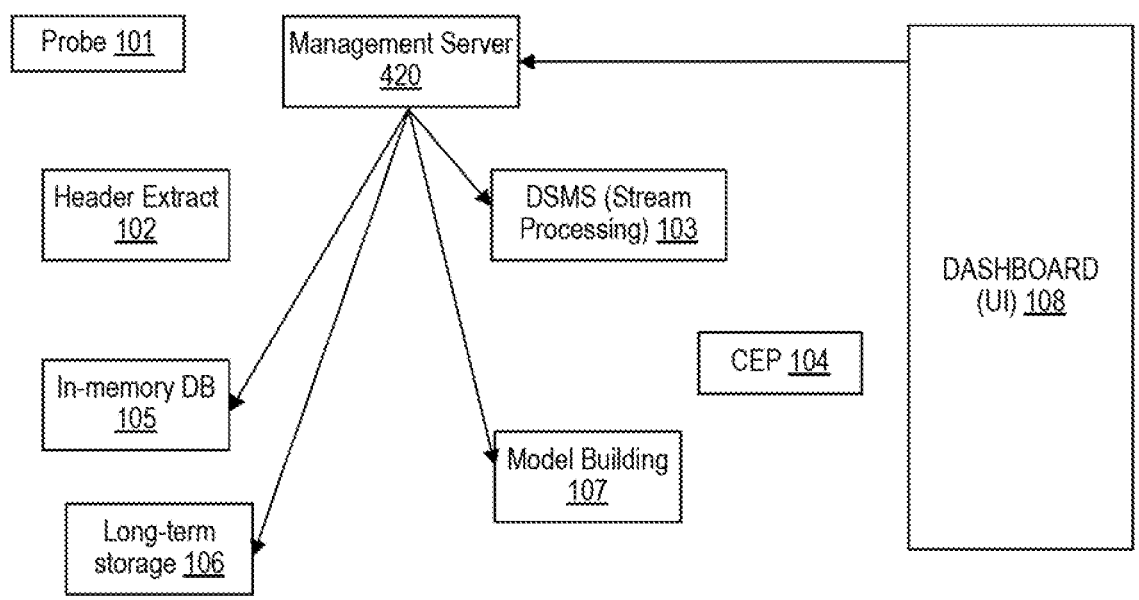

FIGS. 1A to 1C illustrate a system diagram in accordance with an example implementation.

Example implementations include a system having several components such as probe 101, header extractor engine 102, stream processor 103, Complex Event Processing (CEP) engine 104, in-memory database 105, long-term storage 106, model-building/hybrid query engine 107, and dashboard 108. The system generates on-demand trigger based analytics or when necessitated by rules embedded in CEP 104. The system also provides for embedding of learning from the models into the probing edge of network for richer context, using "embedded learning feedback".

For the model-building engine, example implementations utilize a hybrid multi-granular computational approach that aims to build such predictive models over historical, near real time and real time streaming data. In example implementations, the recent-most data is stored in a real-time memory buffer which has limited storage capacity. As more data comes in, some of the data will move from real-time buffer to an in-memory storage which has higher capacity at a lower cost than the real-time memory buffer. Eventually, when the data size grows, it moves from in-memory storage to a historical database where the bulk of the data is stored. Thus, at any given instant, the entire data from the beginning of time (when data generation began) till current time will reside in one or more of the three storage systems: real-time memory buffer, in-memory storage, historical database. Example implementations compute predictive functions on such kind of distributed data.

Several issues may occur in trying to compute such predictive functions. For example, suppose the data is distributed across different storage systems. It can be very expensive to move all data to a single storage system and then compute the function of interest over all data. Hence example implementations utilize a technique to build models jointly over the different storage media without necessitating the moving of all of the data to one location. These models are called hybrid models. Further, the data is always flowing in during the monitoring, so models need to be continuously updated. The cost of computing the function from scratch (using all the distributed data) is prohibitive. To overcome this, example implementations incrementally update the models as new data comes in. This predictive model building is combined with other components in the system.

Example implementations of the system can analyze traffic by building adaptive, hybrid models over different time scales. To this end, example implementations combine individual functions across different storage systems to calculate our function of interest, and update these individual functions as time elapses to update our function of interest. The example implementations of the system can generate on-demand trigger based analytics or when necessitated by rules embedded in a Complex Event Processor (CEP). The example implementations of the system can conduct embedding of learning from the models into the probing edge of network for richer context, using "embedded learning feedback".

In FIG. 1, the probe 101 is configured to sniff, capture, and transmit packets from the edge of the network to Header Extractor 102 as well as In-memory database 105 for further analysis. The collection time scale can be at the nano or micro second level. Probes 101 are programmable to capture all the user traffic or statistically representative sample of the traffic for further analysis. Furthermore, learning from the model building engine 107 and Complex event processing engine 104 is embedded into the probes 101 for context as described in the present disclosure.

Header Extractor Engine 102 is configured to receive packet files from probe 101. Input can be, for example, in the form of packet capture (PCAP) files. Header Extractor Engine 102 extracts the relevant header information and outputs information (metric) file about the packets to be ingested by Data Stream Management System (DSMS) (stream processor) 103. Sample metrics include, among others, source and destination Internet Protocol (IP) addresses between which packets are exchanged, source ports and destination ports through which packets are exchanged, and so on.

DSMS (stream processor) 103 is configured to take information (metric) file as input from Header Extractor Engine 102 and processes the data in real-time. DSMS 103 calculates several primitive figures of merit like utilization (overall network usage as percentage of total network capacity), latency, and so forth, and outputs the result to Dashboard (User Interface/UI) 108 for display. The resulting file is also sent to Complex Event Processing (CEP) engine 104 for detecting events of interest. The time scale of the output information can be at second level, and to in-memory storage and long term storage for hybrid model building.

CEP engine 104 is configured to take the input of the current data sent by stream processor 103 as well as the prediction made by the model builder. In case an event of considerable interest is generated, a trigger is issued to In-memory database 105 to send the relevant packet information to Hybrid query engine 107 for further analytics. Additionally, events can be displayed by themselves on the dashboard 108. Parametric rules can be embedded into the CEP engine 104. These rules can be hard-coded or learnt from the data. For example, rules can be developed from trigger based analytics.

In-memory database 105 is configured to take packet files, which are inputted from the probe 101, to store for near real-time access. The in-memory database 105 sends relevent packet information for further analysis when triggered by rules from CEP engine 104 or on-demand.

Long-term storage 106 is configured to receive packet data, which is inputted for long-term availability. Compact representation of long-term storage data can be achieved by using a combination of harmonic and/or wavelet compression.

Model Building Engine 107 can be configured to handle various tasks. For example, model building engine 107 can be configured to build joint model of model built over data in real time system model built over data in in-memory database 105 as and model build over data in long-term storage component 106. The long-term storage data can capture the long-term trend and seasonality whereas the near real-time data captures the recent behavior. A weighted combination built by the model builder of models built on such hybrid data can be more adaptive than the model built on any single data source. The relevant information from models is output into dashboard 108 for display.

Hybrid query processing 107 can also be configured to analyze packets sent from all the storage systems 105 after a trigger. The analysis can be very fine-grained, and aimed at understanding root cause behind the event in CEP engine 104 that resulted in the trigger. Furthermore, rules learnt from the above analysis can be embedded back into the CEP engine 104 for future use.

Dashboard (UI) 108 is a user-interface configured to display results from stream processor 103, model building engine 107, and CEP engine 104. Hybrid queries can be issued through dashboard as well, depending on the desired implementation.

Embedded Learning Feedback

The learnings from CEP engine 104 and model building engine 107 (in terms of model definition as well as parameters) can be continuously fed back to the probe 101 for intelligent packet capture. For instance, assume that the probe transmits $\rho$ % of data under normal circumstances ($\rho \ll 100$). Now, if a signal is received from the CEP 104 and/or model building engine 107 that a critical event has occurred, thereby requiring all data up to a specified time for diagnosis. Such information can be fed to probe 101 to start transmitting all of the data for the specified time. Note that this can happen in an automated fashion without human interference, and the response time can be very short. Thus, example implementations can utilize intelligent probes based on the learning feedback to reduce the time to action required to respond to events at the edge.

Trigger Based Learning Analytics

FIG. 1B illustrates an example order of the flow of a packet from a probe through the system, in accordance with an example implementation. When the CEP engine 104 triggers a request for analytics based on an event detected (or a request is generated on-demand from end customer), the relevant packets are extracted from in-memory database 105, so as to provide post-hoc analysis for identifying a root cause behind the event. The contents of packet are parsed along with meta-information. Figures-of-merit correlated with the event are computed on the packet data, and trends and other summary statistics on these figures are shown along with packet information on the dashboard. For instance, when CEP engine 104 detects the utilization above a certain threshold (an event), it triggers a request for analytics. Such a trigger is also propagated to the probe 101 to send additional data. The packets then collected in near real-time leading to the event as well as after the event are analyzed. A few correlated figures-of-merit are utilization calculated on related source-destination pairs, latency between the source-destination pairs, and so on. Monitoring trends and other summary statistics over these figures-of-merit can identify the cause behind the event. Rule mining procedures can be deployed on these data to learn statistically significant associations, and these rules can then be embedded back inside CEP engine 104. Additionally, CEP engine 104 can accept hard-coded definitions and rules from the end customer. Note that in related art network management, event correlation engines are used that attempt to relate high-level events to low-level events. Most of the related art engines do not produce new inferred events unlike the CEP engine 104 of the example implementations. Further, CEP engine 104 may be coupled to a Management Server 420 as illustrated in FIG. 1C to facilitate the implementations as described herein. Further details are provided with respect to FIG. 4.

Adaptive, Hybrid Model Computation over Different Time Granularities

Let H denote data stored in historical database, M denote data stored in in-memory database for near-real time data, and R denote the data in real-time memory buffer. At time t, assume the historical period is over $[0,T_1)$; in-memory period is over $[T_1,T_2)$; real-time period is over $[T_2,t]$.

To give a concrete running example, assume that data has been collected from August 10, 42:00 am. The current time is September 5, 3:00 pm. Then H would be from August 10, 42:00 am to September 4, 42:00 am; M would be from September 4, 42:00 am to September 5, 2:50 pm; R would be from September 5, 2:50 pm to September 5, 3:00 pm. Since it can be very expensive to hold data in the real-time memory buffer, assume the storage capacity of real-time memory buffer to be small and fixed. Data moves at the rate of one sample per time stamp from real-time memory buffer to in-memory database. From in-memory to historical storage, data moves in batches with batch size $\alpha$.

The corresponding prediction models learnt are $H_t[0,T_1)$, $M_t[T_1,T_2), R_t[T_2,t]$ over the historical, in-memory, and real-time period respectively. When there is no data in any of the above periods, there is no model learnt over that period. As time progresses, data arrives in each of the storage systems, and corresponding models are learnt subsequently. The overall prediction function at time t is given by:

$$F_t(H_t[0,T_1); M_t[T_1,T_2); R_t[T_2,t])$$

As time progresses, the model is updated accordingly. Let $\alpha_{t'}$ be the time for batch size $\alpha$ to be transferred. Two cases are provided below:

$$\Delta t \leq \alpha_{t'} \quad \text{Case I:}$$

The corresponding prediction models learnt are $H_{t+\Delta t}[0,T_1), M_{t+\Delta t}[T_1,T_2+\Delta t), R_{t+\Delta t}[T_2+\Delta t,t+\Delta t]$ over historical, in-memory, and real-time period respectively. The overall prediction function is given by:

$$F_{t+\Delta t}(H_{t+\Delta t}[0,T_1); M_{t+\Delta t}[T_1,T_2+\Delta t); R_{t+\Delta t}[T_2+\Delta t,t+\Delta t])$$

$$(k+1)\alpha_{t'} \geq \Delta t > k\alpha_{t'} \quad \text{Case II:}$$

The corresponding prediction models learnt are $H_{t+\Delta t}[0, T_1+k\alpha_{t'})$, $M_{t+\Delta t}[T_1+k\alpha_{t'}, T_2+\Delta t)$, $R_{t+\Delta t}[T_2+\Delta t,t+\Delta t]$ over historical, in-memory, and real-time period respectively. The overall prediction function is given by:

$$F_{t+\Delta t}(H_{t+\Delta t}[0,T_1+k\alpha_{t'})); M_{t+\Delta t}[T_1+k\alpha_{t'},T_2+\Delta t); R_{t+\Delta t}[T_2+\Delta t,t+\Delta t])$$

Denote the sample count for historical, in-memory, and real-time by count(H), count(M), and count(R) respectively.

In the below notation, the subscript is introduced on H, M, R. Assume that count(H)>>count(M)>count(R).

Building and updating model over historical data

Model during $H_t$:

For the historical data, time on which model is learnt: $[0,T_1)$. In the running example, this corresponds to learning model from August 10, 42:00 am to September 4, 42:00 am. Also t is September 5, 3:00 pm here. Time for which forecast is generated: $[t+1, \ldots)$ which corresponds to September 5, 3:00:01 pm onwards. Thus, horizon, denoted by $\tau_H$, is count($M_t$)+count($R_t$)+1 (corresponding to time stamp t+1), . . . .

Model during $H_{t+\Delta t}$:

The model $H_t$ needs to be updated.

Time on which $H_{t+\Delta t}$ is learnt: $[0,T_1)$ (case I), $[0,T_1+k\alpha_{t'})$ (case II)

Time for which forecast generated: $[t+\Delta t+1, \ldots)$. Thus, horizon, denoted by $\tau_H$, is count($M_{t+\Delta t}$)+count($R_{t+\Delta t}$)+1, . . . .

Assume that a state-space model is learnt over the learning time in $H_t$:

$$S_j = P_j S_{j-1} + U_j$$

$obs_j = C_j S_j + W_j$ index j is for the sample count in $[0,T_1)$

Further assume the utilization of seasonal autoregressive-moving-average (ARMA), ARMA $(1,1)_{12}$ equation is: $obs_j = \varepsilon obs_{j-12} + \varphi_j + \theta \varphi_{j-12}$ ARMA $(1,1)_{12}$ model expressed in state-space terms:

$$S = P_j S_{j-12} + U_j, obs_j = C_j S_j + W_j$$

$$C_j = (1,0), W_j = O, S_j = (obs_j, \theta\varphi_j)^T$$

$$P_j = \begin{pmatrix} \epsilon & 1 \\ 0 & 0 \end{pmatrix}$$

$$U_j = (\varphi_j, \theta\varphi_j)^T$$

Example Algorithm Implementation 1

In a first example algorithm implementation, Kalman filter equations are used to update the model parameters. Define the following:

$m_j = E[S_j/I_j]$:=optimal estimator of $S_j$ given the information at j, denoted by $I_j$.

$A_j = E[(S_j - m_j)(S_j - m_j)'|I_j]$: =Mean square error (MSE) matrix of $m_j$.

Given $m_{j-1}, A_{j-1}$, at j−1, the optimal predictor of $S_j$ and its associated MSE matrix is given by $$m_{j|j-1} = P_j m_{j-1}$$

$A_{j|j-1} = P_j A_{j-1} P_j' + \text{cov}(U_j)$, cov($U_j$) is the covariance matrix of $U_j$ given by $$\sigma^2 \begin{pmatrix} 1 & \theta \\ \theta & \theta^2 \end{pmatrix}$$

The corresponding optimal estimator of $obs_j$ is given by $obs_{j|j-1} = C_j m_{j|j-1}$ When a new sample is observed, error is obtained by $err_j = obs_j - obs_{j|j-1}$)

MSE matrix of $err_j$: $=Q_j = E[err_j err_g']$

When new sample $obs_j$ is obtained, the optimal predictor $m_{j|j-1}$ and $A_{j|j-1}$ are updated using the following:

$$m_j = m_{j|j-1} + A_{j|j-1} C_j' Q_j^{-1} err_j$$

$$A_j = A_{j|j-1} - A_{j|j-1} C_j' Q_j^{-1} err_j C_j A_{j|j-1}$$

Alternative formulations to avoid numerical instabilities can also be utilized. Let ω denote the parameters of state space model. They can be obtained by minimizing the log likelihood.

Utilizing the model in $H_t$

For j=0, initialize the parameters and obtain $S_0$.

Update using Kalman filter updating procedure shown in the first example algorithm implementation until the time reaches $T_1$ (sample count reaches till the total count we have until $T_1$)

The final prediction for horizon $\tau_H$ is then calculated accordingly as shown in (A)

For $H_{t+\Delta t}$:

For case I, the model learning does not change. For case II, predict the lead times 1, 2, . . . , kα using the above model and update model parameters ($P_j$, $U_j$, $C_j$, $W_j$) based on error obtained compared to actual observations.

Incrementally updating the model from $H_t$ to $H_{t+\Delta t}$

For case I, same as $H_t$

For case II, predict for each 1,2, . . . , kα starting from $H_t$ (Time begins at $T_1$) and update using Kalman filter procedure until $T_1 + k\alpha_{t'}$ is reached The final prediction for horizon $T_H$ is then calculated accordingly as shown in (B)

Building and updating model over near real-time data

Model during $M_t$:

Time on which model is learnt: $[T_1, T_2)$. In the running example, this corresponds to September 4, 42:00 am to September 5, 2:50 pm.

Time for which forecast generated: $[t+1, \ldots)$. In the running example, forecast is generated from September 5, 3:00:01 pm onwards. Thus, horizon ($\tau_M$) is count($R_t$)+1, . . . .

Model during $M_{t+\Delta t}$:

We need to update the model $M_t$.

Time on which $M_{t+\Delta t}$ is learnt: $[T_1, T_2+\Delta t)$ (case I), $[T_1+k\alpha_{t'}, T_2+\Delta t)$ (case II)

Time for which forecast generated: $[t+\Delta t+1, \ldots)$. Thus, horizon ($\tau_M$) is count($R_{t+\Delta t}$)+1, . . . .

Assume we have learnt a state-space model over the learning time in $M_t$:

$$S'_j = P'_j S_{j-1} + U'_j$$

$obs'_j = C'_j S_j' + W'_j$ index j is for the sample count in $[T_1, T_2)$

For $M_{t+\Delta t}$:

For case I, we predict for lead times 1, 2, . . . , count($M_{t+\Delta t}$)−count($M_t$) using the above model and update model parameters ($P'_j$, $U'_j$, $C'_j$, $W'_j$) based on error obtained.

Figure 2:
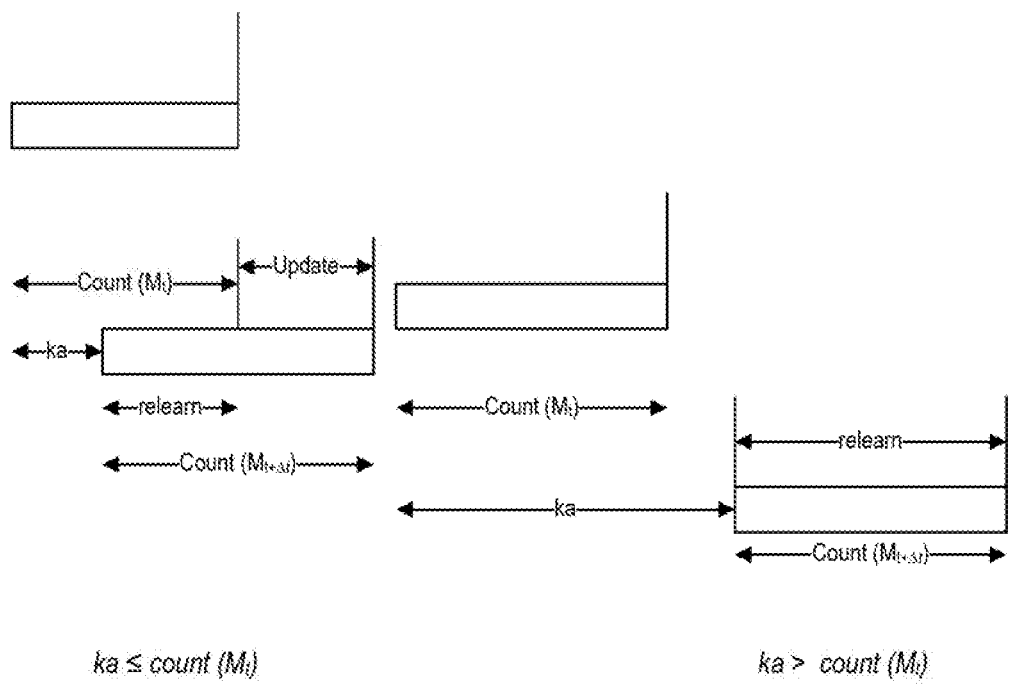
FIG. 2 illustrates the two scenarios for an example case, in accordance with an example implementation.

For case II, example implementations relearn and/or update the model based on the data in $M_{t+\Delta t}$ as illustrated in FIG. 2, for the two possible scenarios:

FIG. 2 illustrates the two scenarios for case II when moving from $M_t$ to $M_{t+\Delta t}$, in accordance with an example implementation.

By applying the ARMA (1,1) equation here: $obs'_j = \varepsilon obs'_{j-1} + \omega_j + \theta \varphi_{j-1}$ (1,1) model expressed in state-space terms:

$$S'_j = S'_{j-1} + U'_j, obs'_j = C'_j S'_j + W'_j$$

$$C'_j = (1,0), W'_j = 0, S'_j = (obs_j, \theta \psi_j)^T$$

$$P'_j = \begin{pmatrix} \epsilon & 1 \\ 0 & 0 \end{pmatrix}$$

$$U'_j(\varphi_j, \theta\varphi_j)^T$$

The model learning and update are in a similar fashion as the first example algorithm implementation.

Building and updating model for streaming data
Model for $R_t$:
Time on which model is learnt: $[T_2, t]$ which corresponds to time from September 5, 2:50 pm to September 5, 3:00 pm
Time for which forecast generated: $[t+1, \ldots)$. In the running example, the forecast is generated from September 5, 3:00:01 pm onwards. Thus, horizon ($\tau_R$) is 1, . . . .
Model during $R_{t+\Delta t}$:
For updating the model $R_t$:
Time on which $R_{t+\Delta t}$ model is learnt: $[T_2+\Delta t, t+\Delta t]$
Time for which forecast generated: $[t+\Delta t+1, \ldots)$. Thus, horizon ($\tau_R$) is 1, . . . .
Assume that a state-space model is learnt over the learning time in $R_t$:

$$S''_j = P''_j S''_{j-1} + U''_j$$

$$obs''_j = C''_j S''_j + W''_j$$

index j is for sample count in $[T_2, t]$
For $R_{t+t}$:
The model is relearned based on the data available in $R_{t+\Delta t}$
The locally linear trend (LLT) model is utilized here which is given by:

$$\mu_j = \mu_{j-1} + \beta_j + \omega_j$$

$$\beta_j = \beta_{j-1} + \rho_j$$

$$obs''_j = \mu_j + \sigma_j$$

LLT model expressed in state space terms:

$$S''_j = P''_j S''_{j-1} + U''_j$$

$$obs''_j = C''_j S''_j + W''_j$$

$$C''_j = (1,0), W''_j = \sigma_j, S''_j = (\mu_j, \beta_j)^T$$

$$P''_j = \begin{pmatrix} 1 & 1 \\ 0 & 1 \end{pmatrix}$$

$$U''_j = (\omega_j, \rho_j)^T$$

The model learning is done in a similar fashion as the first example algorithm implementation.

Let l is time horizon for prediction from current time, count(l) is the number of samples in that time period l.

Making Hybrid Models—Combining models built over historical, near real-time and real time data A choice of the final prediction model would be to create the following:

Assign weights according to error incurred on new samples by exponential function $$F_t: \delta_1 H_t + \delta_2 M_t + (1-\delta_2-\delta_1) R_t$$

Prediction for l is given by:

$$F_t^{count(l)} = \delta_1 H_t^{count(M_t)+count(R_t)+count(l)} + (\delta_2)^{count(R_t)+count(l)} + (1-\beta_2-\delta_1) R_t^{count(l)} \quad (A)$$

For $F_{t+\Delta t}^{t+\Delta t+count(l)}$, substitute t in the above equation (A) with $t+\Delta t$ . . . (B) $H_t^{count(M_t)+count(R_t)+count(l)}$, $M_t^{count(R_t)+count(l)}$, $R_t^{count(l)}$ are computed with the respective horizons from respective models.

$\delta_1$ can be taken to be 0.1-0.2, $\delta_2$ around 0.2-0.35. Alternately, we can use the formulae below to calculate based on error incurred on the incoming sample. $\delta$ may be updated in batch-fashion as shown next.

The average Symmetric mean absolute percentage error (SMAPE) for the observations in time horizon l by predictions based on $H_t$:

$$err_H = \left( \sum_{s=1}^{count(l)} \frac{|actual_s - pred_s|}{actual_s + pred_s} \right) * \frac{1}{count(l)}$$

Where $actual_s$ is the actual observed value, $pred_s$ is the predicted value from the model. Define $err_M$ and $err_R$ based on prediction from $M_t$ and $R_t$ respectively.

$$\delta_1 = \frac{\exp(-err_H)}{(\exp(-err_H) + \exp(-err_M) + \exp(-err_R))} \quad (C)$$

$$\delta_2 = \frac{\exp(-err_M)}{(\exp(-err_H) + \exp(-err_M) + \exp(-err_R))}$$

Figure 3A:
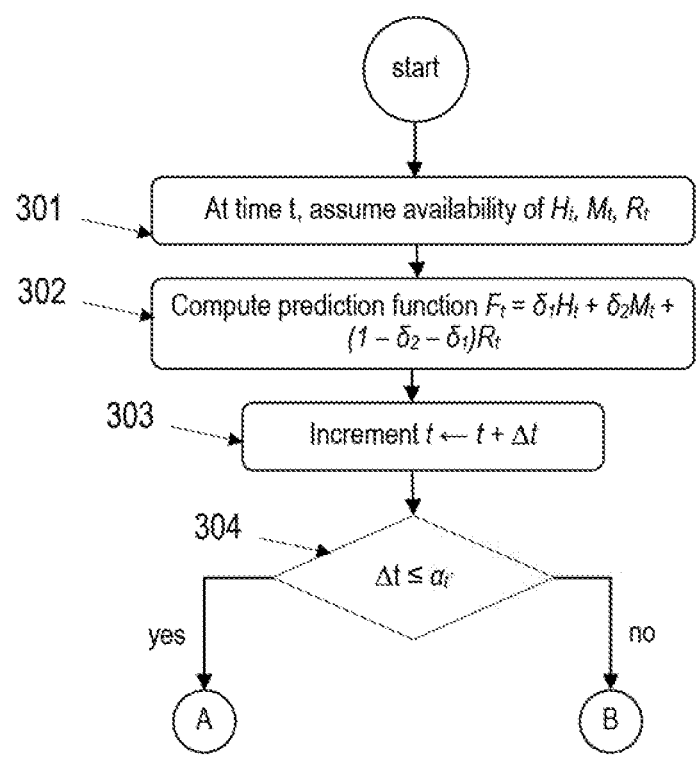
FIGS. 3A to 3C illustrates a flow diagram for model construction, in accordance with an example implementation.
Figure 3B:
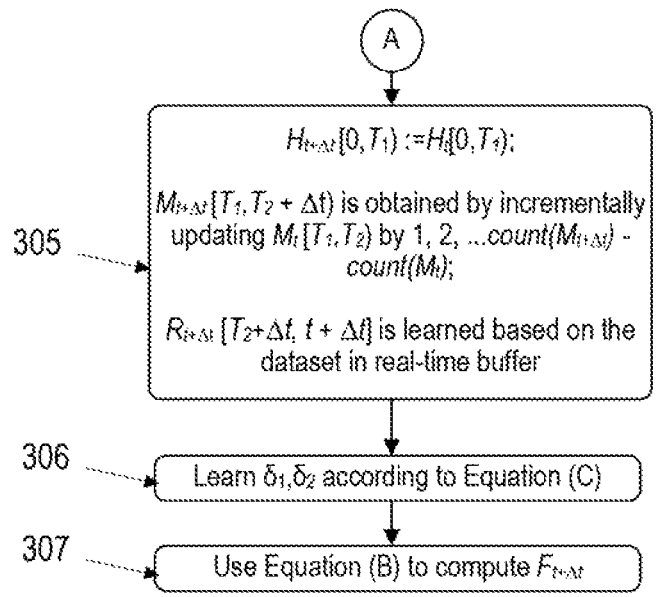
Figure 3C:
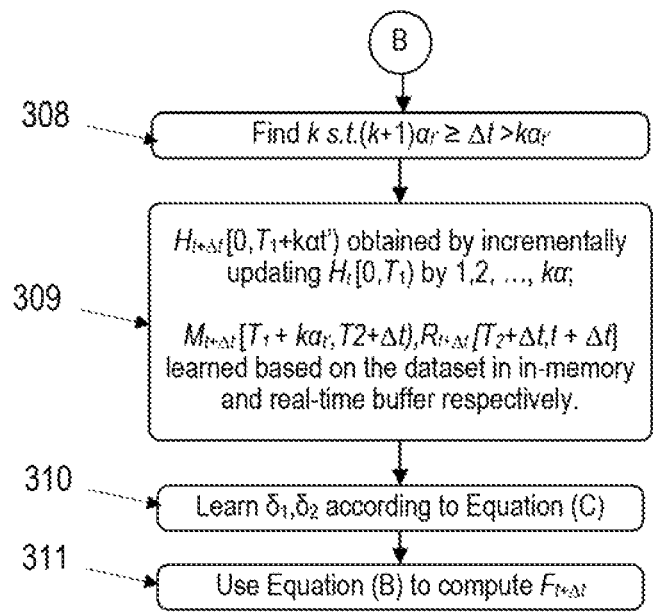

FIGS. 3A to 3C illustrate the flow diagram for the model construction, in accordance with an example implementation. Specifically, FIGS. 3A to 3C illustrate the flow diagrams for the implementations of the models created above.

At 301 the availability of the three models for the long term storage, real time storage, and, near real time storage. At 302, the prediction models are computed along with the weights. At 303, the system proceeds for a time until the time interval is reached or until an event is triggered. At 304, a check is determined to see if the incremented time is greater than the desired time interval. If so (YES), then the flow proceeds to the flow of FIG. 3B, otherwise (NO), the flow proceeds to the flow of FIG. 3C.

For FIG. 3B, the determination is that the time interval has been met. In which case the flow proceeds to 305 to learn each of the models for the real time storage, the near real time storage, and the long term storage from the advanced time. The weights are updated based on equation (C) above at 306, and equation (B) is utilized to determine the overall prediction model at 307.

For FIG. 3C, the determination is made that the time interval has not been met. For this situation, the time is incremented in intervals until the time interval is exceeded at 308 and the models for each of the long term storage, near real time storage, and real time storage are obtained at 309. The weights are updated based on equation (C) above at 310, and equation (B) is utilized to determine the overall prediction model at 311.

Figure 4:
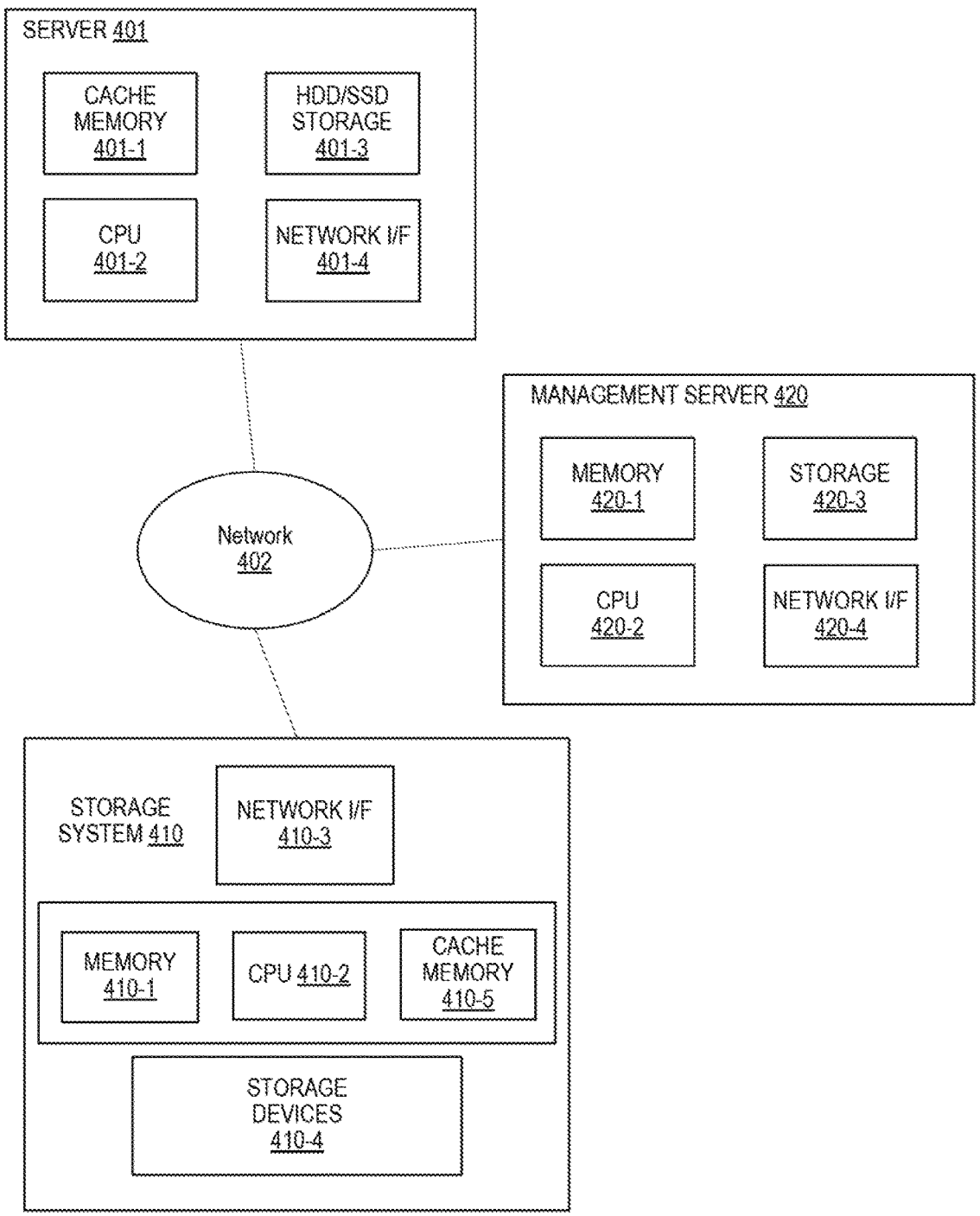
FIG. 4 illustrates an example storage system, in accordance with an example implementation.

FIG. 4 illustrates an example storage system, in accordance with an example implementation. Specifically, FIG. 4 illustrates hardware configuration of the elements that make up the storage architecture upon which the system of FIGS.

1A to 1C can be implemented. Such hardware implementations can include the server 401, the network 402, and a storage system 410.

Server 401 may include a cache memory 401-1, a central processing unit (CPU) 401-2, Hard Disk Drive/Solid State Drive (HDD/SSD) storage 401-3 and Network interface (I/F) 401-4. Cache memory 401-1 may be configured to receive a stream of data and store the stream of data for real time data management and behave as a memory buffer, which can be copied over to HDD/SSD storage 401-3 each period of time configured depending on the desired implementation (e.g., every 5 min.). Storage 401-3 may be configured to receive data from cache memory 401-1 for a longer period of storage (e.g., one day) before the data is migrated to the longer term storage of the storage system 410, and can function as the in memory database 105 of FIGS. 1A to 1C. CPU 401-2 may load one or more application programming interfaces (APIs) to perform the functions of the probe 101 and the header extract 102, depending on the desired implementation. Network I/F 401-4 is configured to interface with network 402.

Storage system 410 may include memory 410-1, CPU 410-2, network I/F 410-3, a cache memory 410-5, and one or more storage devices 410-4 (disks). The memory 410-1, the CPU 410-2, and the cache memory 410-5 can be included in a storage controller. The memory 410-1 may store programs of storage function, and the CPU 410-2 performs operations or instructions associated with the programs stored in the memory to utilize the storage function. The Network I/F 410-3 is configured to interact with the network 402 to interact with server 401 and/or other storage systems to obtain the desired storage profile or to provide the desired storage template. The cache memory 410-5 temporarily stores data corresponding read/write request to accelerate response time to the request from a server. One or more storage devices 410-4 provide the capacity for forming one or more storage volumes which can be incorporated as long term storage for storing data migrated from the HDD/SDD storage 401-3 for historical record for a longer period of time (e.g. one month) and can provide dedicated storage to the system.

Management Server 420 may include a memory 420-1, a central processing unit (CPU) 420-2, storage 420-3 and Network interface (I/F) 420-4. Storage 420-3 may be utilized to manage one or more APIs to perform the algorithms as described herein, which can be loaded into memory 420-1 and executed by CPU 420-2 in the case that the management server acts as a management computer.

Memory 420-1 can be configured to manage a first prediction model of traffic to a first type of storage configured to store data for a first time period in the storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period. This configuration and prediction model management can account for the real time data streamed to the memory buffer type storage such as the cache memory 401-1 and later moved to the HDD/SSD storage 401-3 of the server 401, in configurations where the server 401 acts as a memory buffer before data is sent to the dedicated storage of the storage system 410 such as the storage volumes provided through the pool of storage devices 410-4. In the example provided herein, the first type of storage can be the cache memory 401-1, the second type of storage can be the HDD/SSD storage 401-3, and the third type of storage can be storage provided by the storage system 410, however, other configurations are also possible depending on the desired implementation and the present disclosure is not limited to this example. Memory 420-1 may be configured to store one or more time intervals, wherein the server 401 moves data from the cache memory 401-1 to the HDD/SSD 401-3, and for moving data from the HDD/SSD 401-3 to the storage system 410.

The CPU 420-2 performs one or more of the flow diagrams as described herein, such as the ones described in FIGS. 3A to 3C, FIGS. 6A to 6C, and so on. CPU 420-2 may be configured to a processor, configured to compute a prediction model of traffic to the storage system based on the application of weights to the first prediction model, the second prediction model, and the third prediction model; and update the application of weights based on traffic results as illustrated in FIGS. 3A to 3C. Accordingly, CPU 420-2 can incorporate recent stream data to the first storage type in the first prediction model; incorporate the stored data moved from the first type of storage to the second type of storage in the second prediction model; and incorporate the stored data moved from the second storage type to the third storage type in the third prediction model.

When recent stream data is obtained by the cache memory 401-1, the CPU 420-2 may update the first prediction model based on the recent stream data, and track the data movement from the cache memory 401-1 to the HDD/SSD storage 401-3, and from the HDD/SSD storage 401-3 to the storage system 410. When data is not moved from the HDD/SSD storage 401-3 to the storage system 410 after receipt of the recent stream data, the CPU 420-2 may update the second prediction model based on the stored data moved from the cache memory 401-1 to the HDD/SSD storage 401-3, and update the third prediction model based on the stored data moved to the storage system 410, in accordance with the flow diagrams of FIGS. 3A to 3C. When the data is moved from the HDD/SSD storage 401-3 to the storage system 410, CPU 420-2 may construct a new model on the stored data of the HDD/SSD storage 401-3 and moved from the cache memory 401-1, and update the third prediction model based on the stored data moved to the storage system 410.

CPU 420-2 may also be configured to compute the prediction model of traffic to the storage system and update the application of weights in response to a detected event as illustrated in FIGS. 3A to 3C.

Figure 5:
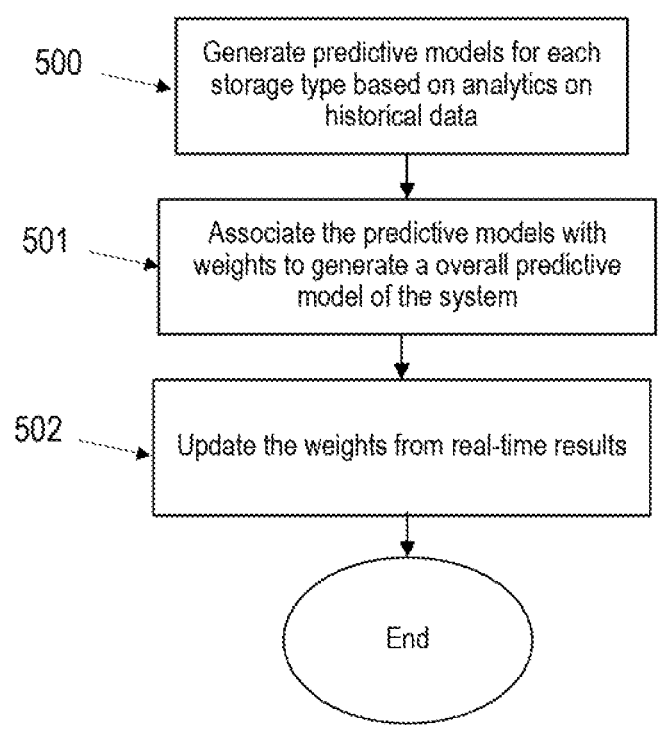
FIG. 5 illustrates a flow diagram in accordance with an example implementation.

FIG. 5 illustrates a flow diagram in accordance with an example implementation. Specifically, FIG. 5 illustrates an overall flow diagram of example implementations. At 500, the system generates predictive models for each storage type based on analytics on historical data. At 501, the predictive models are associated with weights to generate an overall predictive model of the system. At 502, the weights are updated from real-time results.

Figure 6A:
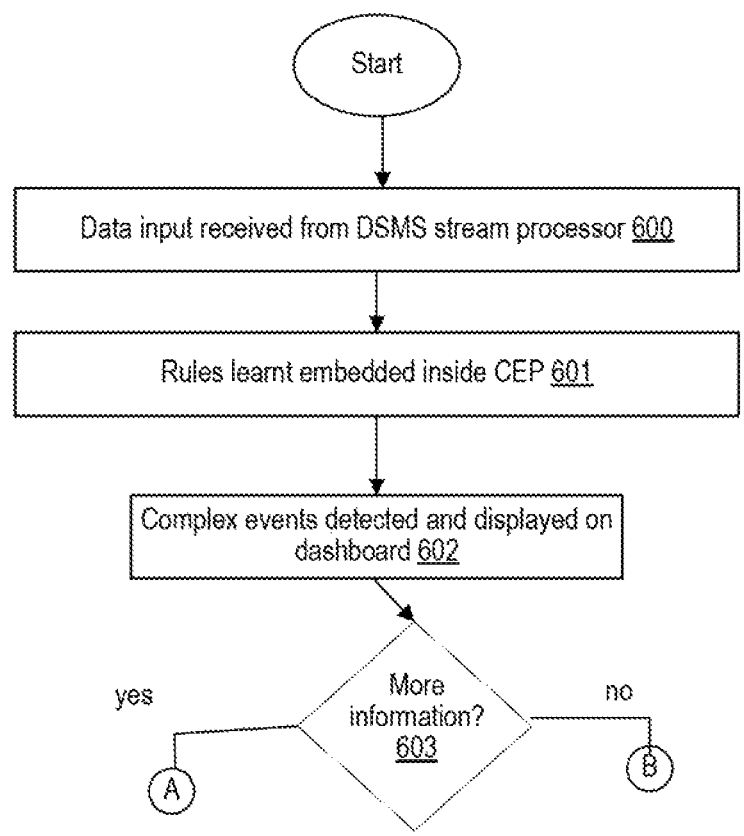
FIGS. 6A to 6C illustrate the flow diagram for the CEP engine, in accordance with an example implementation.
Figure 6B:
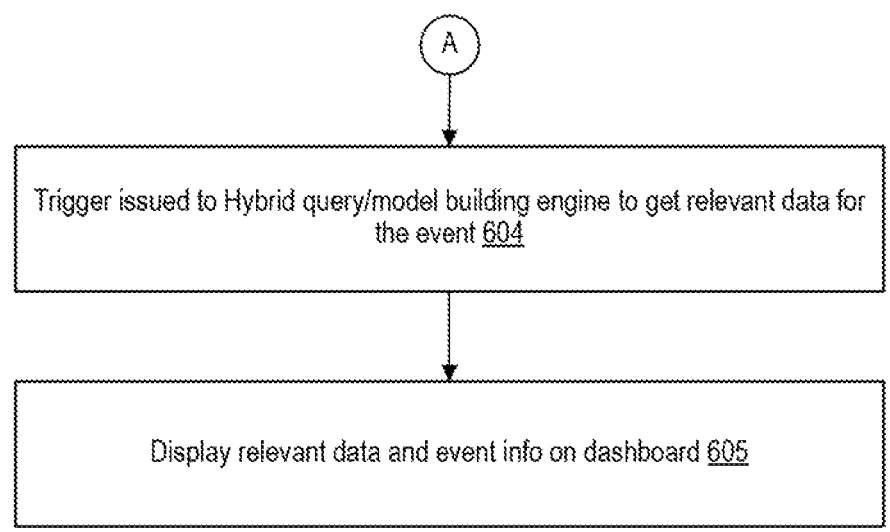
Figure 6C:
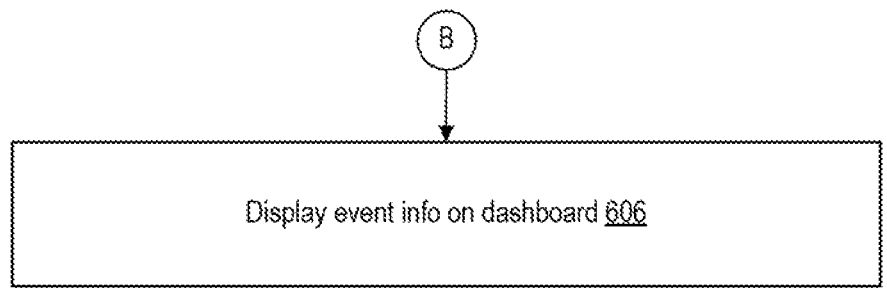

FIGS. 6A to 6C illustrate the flow diagram for the CEP engine 104, in accordance with an example implementation. At 600, data input is received from the DSMS stream processor 103. At 601, the rules learnt are embedded inside CEP engine 104. At 602, all complex events are detected and displayed on the UI dashboard 108. At 603, a determination is made as to whether the user has requested more information through UI dashboard 108. If so (YES), then the flow proceeds to FIG. 6B, otherwise (NO), the flow proceeds to FIG. 6C. In FIG. 6B, a trigger is issued to the hybrid query/model building engine 107 to get relevant data for the event at 604, wherein the relevant data and event information is displayed on the dashboard at 605. In FIG. 6C, event information is displayed at the dashboard at 606.

FIG. 7 illustrates example management information for the management server 420, in accordance with an example implementation. Management server 420 may maintain different management information when managing the server 401 and storage system 410, and can be stored in memory 420-1. Such information can include the current time stamp of data streamed in through the cache memory 401-1 of the server 401, the window size which indicates the time period for storing data streamed in cache memory 401-1 before it is moved to the storage 401-3, in-memory time interval which indicates the time period for transferring data from the storage 401-3 to the storage system 410. In memory storage capacity indicates the available storage for storage 401-3. Batch size indicates the size of data to be transferred from storage 401-3 to storage system 410. The management information of FIG. 7 is an example, and may have different fields depending on the desired implementation.

Finally, some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management server comprising:
   a memory configured to manage a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period;
   a processor, configured to:
   compute a prediction model of traffic to the storage system based on the application of weights to the first prediction model, the second prediction model, and the third prediction model; and
   update the application of weights based on traffic results;
   wherein the first type of storage is a memory buffer type storage and is different from the second type of storage, and wherein the third type of storage is a dedicated storage for the storage system;
   wherein the memory is further configured to store one or more time intervals;
   wherein the first type of storage is configured to move the stored data from the first type of storage to the second type of storage according to one of the one or more time intervals;
   wherein the second type storage is configured to move the stored data from the second type of storage to the third type of storage according to the one or another one of the one or more time intervals.

2. The management computer of claim 1, wherein the processor is configured to:
incorporate recent stream data to the first storage type in the first prediction model;
incorporate the stored data moved from the first type of storage to the second type of storage in the second prediction model; and
incorporate the stored data moved from the second storage type to the third storage type in the third prediction model.

3. The management server of claim 2, wherein the processor is configured to:
update the first prediction model based on the recent stream data;
for data not moved from the second type of storage to the third type of storage, update the second prediction model based on the stored data moved from the first type of storage to the second type of storage, and update the third prediction model based on the stored data moved from the second type of storage to the third type of storage;
for data moved from the second type of storage to the third type of storage, construct a new model on the stored data of the second type of storage that was moved from the first type of storage, and update the third prediction model based on the stored data moved to the third type of storage.

4. The management server of claim 1, wherein the processor is configured to compute the prediction model of traffic to the storage system and update the application of weights in response to a detected event.

5. The management server of claim 1, wherein the processor is configured to obtain an overall prediction of the storage system from the prediction model based on applying the weights to the first prediction model, the second prediction model, and the third prediction model.

6. A method, comprising:
managing a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period;
computing a prediction model of traffic to the storage system based on the application of weights to the first prediction model, the second prediction model, and the third prediction model; and
updating the application of weights based on traffic results;
wherein the first type of storage is a memory buffer type storage and is different from the second type of storage, and wherein the third type of storage is a dedicated storage for the storage system;
wherein the memory is further configured to store one or more time intervals;
wherein the first type of storage is configured to move the stored data from the first type of storage to the second type of storage according to one of the one or more time intervals;
wherein the second type storage is configured to move the stored data from the second type of storage to the third type of storage according to the one or another one of the one or more time intervals.

7. The method of claim 6, further comprising:
incorporating recent stream data to the first storage type in the first prediction model;
incorporating the stored data moved from the first type of storage to the second type of storage in the second prediction model; and
incorporating the stored data moved from the second storage type to the third storage type in the third prediction model.

8. The method of claim 7, further comprising:
updating the first prediction model based on the recent stream data;
for data not moved from the second type of storage to the third type of storage, updating the second prediction model based on the stored data moved from the first type of storage to the second type of storage, and updating the third prediction model based on the stored data moved from the second type of storage to the third type of storage;
for data moved from the second type of storage to the third type of storage, constructing a new model on the stored data of the second type of storage that was moved from the first type of storage, and updating the third prediction model based on the stored data moved to the third type of storage.

9. The method of claim 6, wherein the computing the prediction model of traffic to the storage system and updating the application of weights is conducted in a continuous fashion.

10. The method of claim 6, further comprising obtaining an overall prediction of the storage system from the prediction model based on applying the weights to the first prediction model, the second prediction model, and the third prediction model.

11. A non-transitory computer readable medium, storing instructions for executing a process, the instructions comprising:
managing a first prediction model of traffic to a first type of storage configured to store data for a first time period in a storage system, a second prediction model of traffic to a second type of storage configured to store data for a second time period in the storage system, and a third prediction model of traffic to a third type of storage configured to store data for a third time period in the storage system, wherein the second time period is longer than the first time period, and wherein the third time period is longer than the second time period;
computing a prediction model of traffic to the storage system based on the application of weights to the first prediction model, the second prediction model, and the third prediction model; and
updating the application of weights based on traffic results;
wherein the first type of storage is a memory buffer type storage and is different from the second type of storage, and wherein the third type of storage is a dedicated storage for the storage system;
wherein the memory is further configured to store one or more time intervals;
wherein the first type of storage is configured to move the stored data from the first type of storage to the second type of storage according to one of the one or more time intervals;
wherein the second type storage is configured to move the stored data from the second type of storage to the third type of storage according to the one or another one of the one or more time intervals.

* * * * *